United States Patent
Kabai et al.

(10) Patent No.: US 8,337,348 B2
(45) Date of Patent: Dec. 25, 2012

(54) SILENT CHAIN

(75) Inventors: Tsuyoshi Kabai, Osaka (JP); Shuuji Hamaguchi, Osaka (JP); Takayuki Morimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 561 days.

(21) Appl. No.: 12/647,633

(22) Filed: Dec. 28, 2009

(65) Prior Publication Data
US 2010/0216580 A1     Aug. 26, 2010

(30) Foreign Application Priority Data
Feb. 25, 2009   (JP) .................................. 2009041838

(51) Int. Cl.
*F16G 13/02*     (2006.01)

(52) U.S. Cl. ........................................ 474/207; 474/215

(58) Field of Classification Search ................... 474/207, 474/215
See application file for complete search history.

(56) References Cited

U.S. PATENT DOCUMENTS

| | | | | |
|---|---|---|---|---|
| 1,896,711 | A * | 2/1933 | Lichtenberg | 37/465 |
| 4,337,057 | A * | 6/1982 | Horowitz et al. | 474/242 |
| 5,114,384 | A * | 5/1992 | Tsuyama | 474/212 |
| 6,572,503 | B2 * | 6/2003 | Horie et al. | 474/213 |
| 2002/0010047 | A1 * | 1/2002 | Kurokawa et al. | 474/231 |
| 2003/0233821 | A1 | 12/2003 | Matsuda | |

* cited by examiner

*Primary Examiner* — Sang Kim
(74) *Attorney, Agent, or Firm* — Howson & Howson LLP

(57) ABSTRACT

In a silent chain, cushion pads are provided in the inner flank regions of at least every second link row. These cushion pads restrict inward flexion of the chain and reduce vibration of the free span regions of the chain. The cushion pads can be individual pads each associated with a link plate, or elongated pads each associated with a row of link plates. In either case, side parts protruding toward the outside of the loop formed by the chain can also restrict outward flexion of the chain.

8 Claims, 13 Drawing Sheets

SILENT CHAIN

CROSS-REFERENCE TO RELATED APPLICATION

This application claims priority on the basis of Japanese patent application 2009-041838, filed Feb. 25, 2009. The disclosure of Japanese application 2009-041838 is hereby incorporated by reference.

FIELD OF THE INVENTION

This invention relates to a silent chain for use in a chain transmission, a transfer conveyor, or the like. It relates more specifically to a silent chain comprising an elongated series of interleaved rows of link plates, each link plate having front and rear V-shaped teeth for engagement with sprocket teeth, a flank region between the front and rear V-shaped teeth for receiving sprocket teeth without contacting the sprocket teeth, and front and rear connecting pin holes formed in each link plate respectively adjacent the front and rear V-shaped teeth, the V-shaped teeth being arranged in parallel rows extending in a direction of the chain width perpendicular to the direction of elongation of the chain, and connecting pins extending through the pin holes in the direction of the chain width, and flexibly connecting the interleaved rows of link plates to one another to form an endless loop.

BACKGROUND OF THE INVENTION

In a silent chain described in United States Patent Publication 2003/0233821, published December 25, link plates, having a pair of teeth and a pair of pin holes and pivotally connected by connecting pins, have lateral protrusions that restrict outward flexion of the chain, i.e., flexion of link plates toward the outside of the loop formed by the chain. The protrusions restrict outward flexion by interference between the protrusions of the link plates and the shoulders of adjacent link plates. The protrusions on the link plates can be formed by subjecting the link plates to a pressing operation.

SUMMARY OF THE INVENTION

In the silent chain described in United States Patent Publication 2003/0233821, where the protrusions are unitary parts of the link plates, the physical properties of the protrusions are limited by the material of which the plates are composed. Thus, when a link plate is formed of hard material such as steel, vibration and noise are generated due to contact between the protrusions and the shoulders of adjacent toothed link plates or guide links. In addition, because the protrusions typically have low strength, the chain is subject to fatigue failure due to repeated contact with the shoulders of adjacent toothed link plates or guide links.

In this invention, inward flexion of the chain, i.e., flexion of a link plate toward the inside of the loop formed by the chain, is limited by the use of cushion pads in order to suppress chordal vibration. The suppression of chordal vibration is achieved without impairing freedom in the design of the V-shaped teeth and the cushion pads. Flexion of the chain toward the outside of the loop can also be restricted, drive vibration can be absorbed, and a positive supply of lubricating oil to the components of the chain can be maintained.

The silent chain according to the invention comprises an elongated series of interleaved rows of link plates. Each link plate has front and rear V-shaped teeth for engagement with sprocket teeth, and an inner flank region between its front and rear V-shaped teeth for receiving sprocket teeth without contacting the sprocket teeth. Front and rear connecting pin holes are formed in each link plate, respectively adjacent its front and rear V-shaped teeth. The V-shaped teeth are arranged in parallel rows extending in a direction of the chain width perpendicular to the direction of elongation of the chain, and connecting pins extending through the pin holes in the direction of the chain width flexibly connect the interleaved rows of link plates to one another to form an endless loop. Cushion pads are provided in the inner flank regions of the link plates of at least every second row of link plates. The cushion pad in the inner flank region of each link plate extends in the direction of the chain width beyond the sides of the last-mentioned link plate.

The parts of the cushion pads that extend beyond the sides of the link plates protrude into the spaces link plates of adjacent rows, and restrict flexion of the chain toward the inside of the loop. As a result, chordal vibration is reliably suppressed in the free span regions of the chain where there is no contact with a sprocket or chain guide, and reduction in noise due to chordal vibration can be realized.

Since the cushion pads do not contact the sprocket teeth, they do not influence engagement between the V-shaped link teeth and the sprocket teeth. Thus, the cushion pads do not interfere with the design of the engagement surfaces of the V-shaped link teeth.

The cushion pad material is more flexible than the material of the link plates. Consequently, vibration and noise due to contact between the protruding parts of the pads and adjacent link plates is avoided, and damage to the protruding parts and to the link plates is also avoided. The cushion pads also absorb drive vibration, which inevitably occurs in the link plates during operation of the chain. Thus a high degree of noise suppression can be achieved.

Furthermore, since the cushion pads are elements formed separately from the link plates, their strength and flexibility can be selected to meet the requirements of the chain drive environment.

In accordance with another aspect of the invention, each cushion pad can be a continuous pad extending through substantially the full length of the row of toothed link plates in the flank regions of the row in which it is situated. In this case, where there is one cushion pad element for each link row, the number of parts of the chain is reduced, and manufacture of the chain is simplified. Moreover, since each elongated cushion pad positions a plurality of link plates, backlash of link plates during operation of the chain can be avoided.

In accordance with another aspect of the invention, each cushion pad has side parts disposed on both sides of each of the link plates in the link plate row in the inner flank region of which the cushion pad is provided, each part extending toward the outside of the loop formed by the chain and at least a part of each part becoming progressively wider proceeding in a direction toward the outside of the loop.

The parts of the cushion pads that extend toward the outside of the loop restrict outward flexion of the chain. With both inward and outward flexion restricted, still better suppression of chordal vibration of the chain in its free span regions can be achieved. The outwardly extending parts of the cushion pads also position the link plates in the chain width direction and block backlash of the link plates in the chain width direction during operation of the chain. Moreover, the outwardly extending parts of the cushion pads increase the contact area between the link plates and the cushion pads, thereby increasing the vibration-absorbing effect of the cushion pads.

In accordance with still another aspect of the invention, each cushion pad is formed of a material which retains lubricating oil. Because the protruding parts of the cushion pads are sandwiched between pairs of link plates in adjacent rows, they are repeatedly compressed and expanded during operation of the chain. Consequently, these sandwiched parts of the cushion pads exert a pumping effect, supplying lubricating oil retained inside the cushion pads to various components of the chain, and maintaining smooth flexion of the chain. In particular, since the cushion pads are provided in the flank regions of the link plates between their front and rear V-shaped link teeth, lubricating oil is positively supplied to the V-shaped link teeth, where they engage with sprocket teeth.

DETAILED DESCRIPTION OF THE PREFERRED EMBODIMENTS

Various configurations of the silent chain according to the invention may be adopted, provided that cushion pads are provided in the inner flank regions of the link plates of each of its rows of link plates, and the cushion pad in the inner flank region of each link plate extends in the direction of the chain width beyond the sides of the link plate. For example, the connecting pins of the chain can be either round pins, or rocker pins composed of long and short pins. The cushion pads can be composed of various compressible materials such as felt, a nonwoven fabric, or a sponge-like material, all preferably having a property such that they can be impregnated with oil. A felt cushion pad is preferred because of its superior oil impregnation properties and its high flexibility, which allow its lubrication oil-supplying effect to be exhibited over a long period of time, and because of its superior ability to absorb drive vibration, which inevitably occurs in the chain components during operation of the chain.

Figure 1:
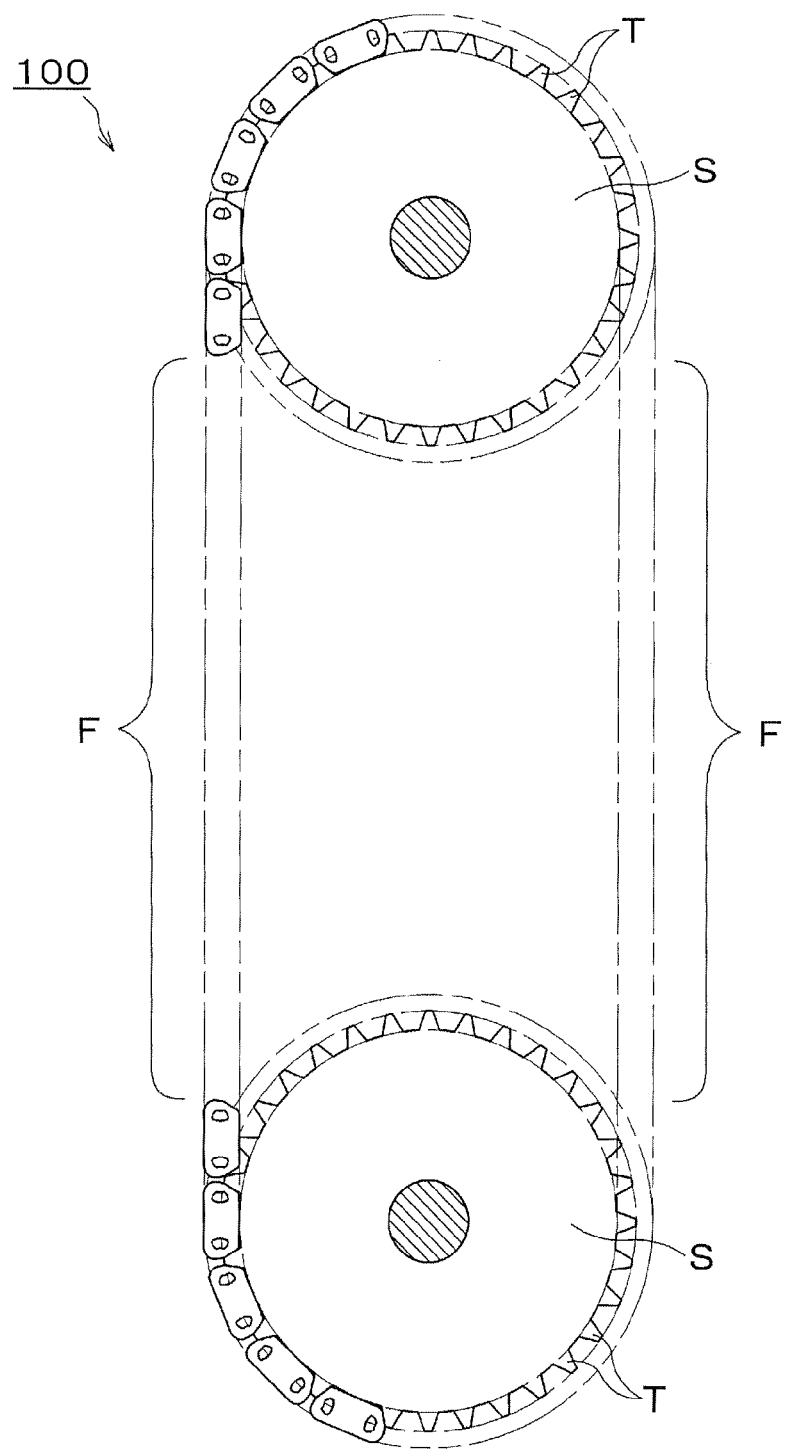
FIG. 1 is a schematic view showing a silent chain according to a first embodiment of the invention engaged with two sprockets.

A silent chain 100, according to a first embodiment of the invention, is depicted in FIGS. 1-4. The chain is engaged with sprockets S as shown in FIG. 1, one of which is driving sprocket and the other of which is a driven sprocket.

Figure 2:
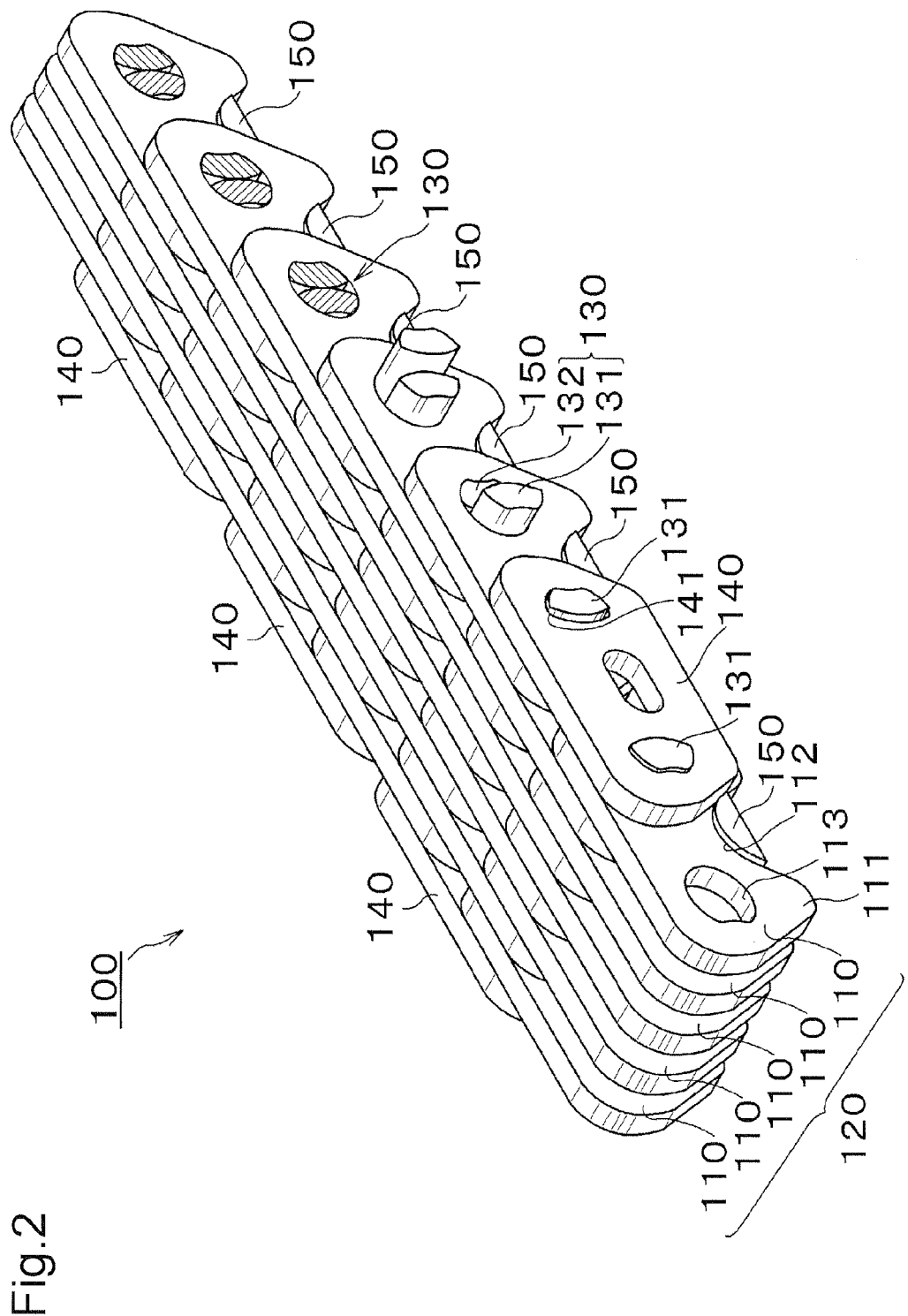
FIG. 2 is a perspective view of a part of the chain.
Figure 3:
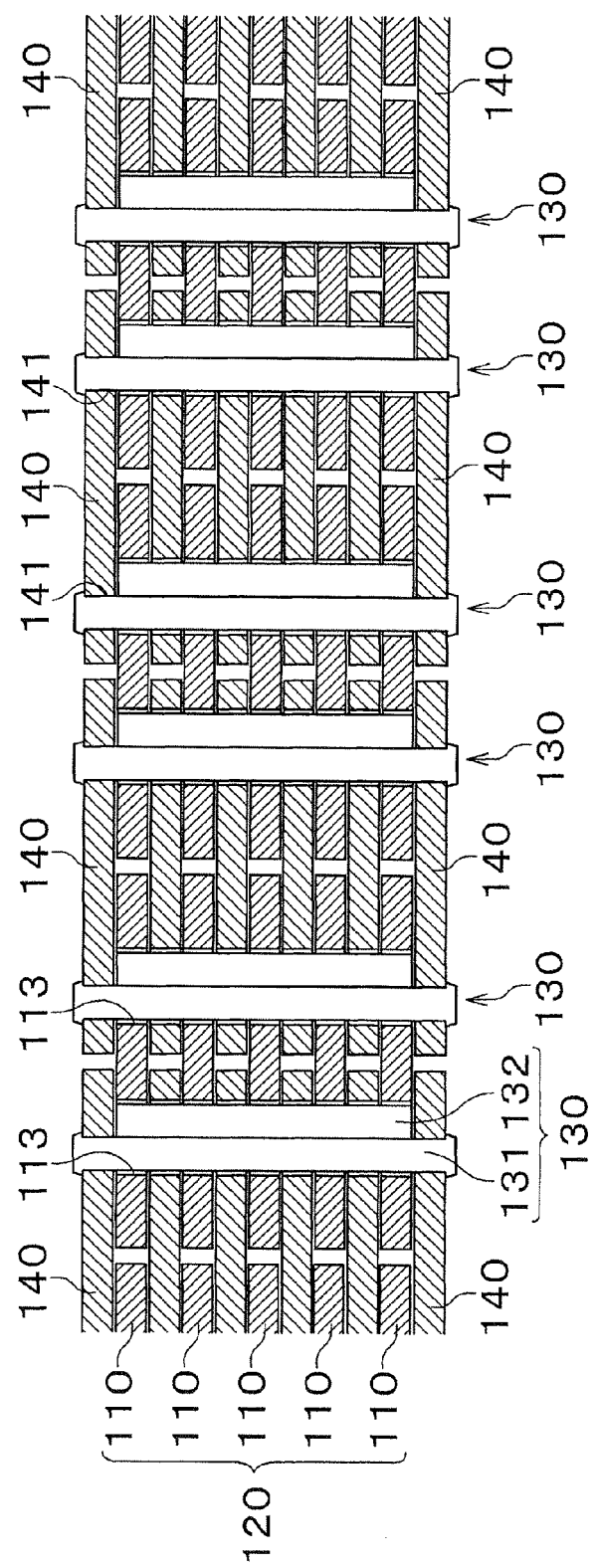
FIG. 3 is a cross-sectional view of the chain.
Figure 4:
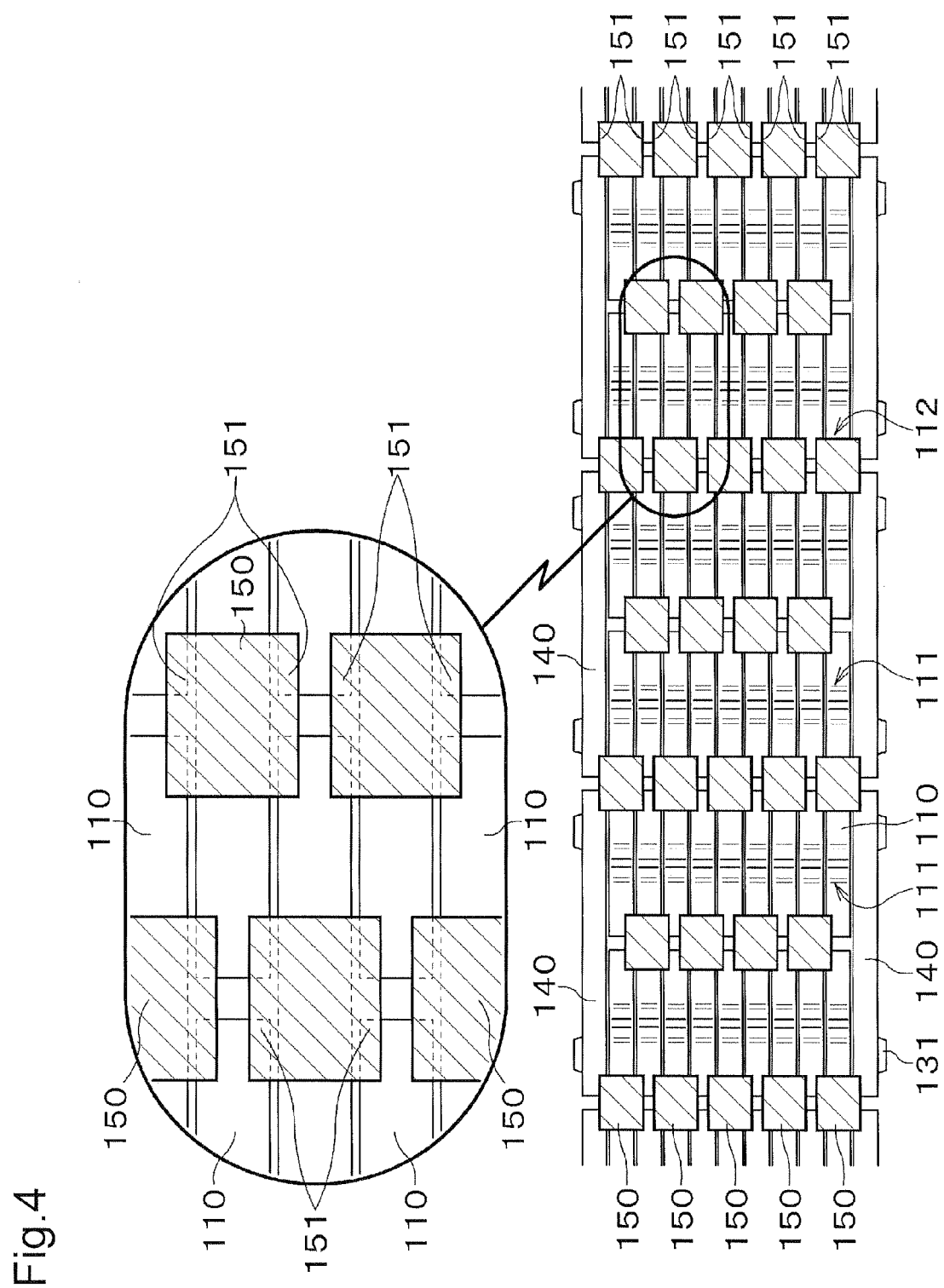
FIG. 4 is a plan view of the chain as seen from the inner circumferential side thereof.

As shown in FIGS. 2 and 3, the silent chain 100 is formed by interleaved link rows 120, each of which extends in the direction of the width of the chain and is composed of link plates 110, each having front and rear, V-shaped, teeth 111, which engage teeth T (FIG. 1) of the sprockets S. Flank regions 112, between the front and rear V-shaped teeth 111, are continuous from the front V-shaped tooth to the rear V-shaped tooth. These flank regions are opposed to, and receive, sprocket teeth T without contacting the sprocket teeth. Front and rear connecting pin holes 113 are formed adjacent the respective front and rear teeth 111. The front pin holes in a row are aligned with one another in the direction of the width of the chain, as are the rear pin holes. The interleaved link rows are flexibly connected by connecting pins 130, which extend through the connecting pin holes. In the embodiment shown, the connecting pins 130 are rocker pins, each consisting of a long pin 131 and a short pin 132.

Guide plates 140 are provided on the outermost sides of the chain. Each of these guide plates has pair of connecting pin holes 141, into which ends of the long pins 131 are press-fit.

Substantially semi-cylindrical, cushion pads 150, i.e., cushion pads that are cylindrical with a semi-circular cross-section, have substantially circular parts that conform to the shapes of the flank regions 112 of the link plates. These cushion pads are adhered to the link plates in the flank regions thereof. As shown in the enlarged auxiliary view which forms part of FIG. 4, the widthwise dimension of each cushion pad 150 is greater than the width of a link plate so that it has portions 151 that extend widthwise beyond both sides of the link plate to which it is adhered toward adjacent plates in the same row. In the case of a guide row, i.e., a row that includes guide plates 140 aligned widthwise of the chain with toothed link plates, each cushion pad on an outermost toothed link plate has a portion 151 that extends outward toward a guide plate and another portion 151 that extends inward toward an adjacent toothed link plate.

Each cushion pad 150 is composed of an oil-retaining material, which retains lubricating oil within its interior.

In the silent chain 100, the widthwise dimension of each cushion pad 150 is greater than the width of the link plate 110 to which it adheres. The pad portions 151 that extend beyond the sides of the link plates enter spaces between link plates of adjacent rows, and by engaging adjacent link plates, restrict flexion of the link plates of the chain toward the inside of the loop formed by the chain. Chordal vibration in a free span region F (FIG. 1) where there is no contact with a sprocket S or with a chain guide (not shown), can be reliably suppressed, and noise due to chordal vibration can be prevented.

Since the cushion pads 150 in the flank regions 112 are opposite to, but do not contact, the sprocket teeth T, they do not affect the engagement between the link teeth 111 and the sprocket teeth T, and therefore allow the chain designer a broad degree of freedom in the design of the engagement surfaces of the V-shaped link teeth 111.

The cushion pads 150 are flexible, and therefore avoid the generation of vibration and noise due to contact between pad portions 151 and the link plates of adjacent rows. Flexibility of the cushion pads also eliminates damage to the pad portions 151 and to the link plates 110 and guide plates 140. The cushion pads 150 also avoid drive vibration, which would otherwise inevitably occur in the link plates during operation of the chain. Thus, the generation of the noise during operation of the chain is further suppressed.

Since the cushion pads 150 are elements formed separately from the link plates 110, the designer is afforded a high degree of freedom in the design of the cushion pads, and can adjust their strength and flexibility in accordance with the requirements of the chain drive environment.

Since the cushion pads 150 are formed of an oil retaining material, and each of the protruding pad portions 151 is sandwiched between a pair of adjacent link plates 110 or guide plates 140, the protruding portions 151 of the pads repeatedly expand and contract during operation of the chain drive, and exhibit an oil pumping effect so that the cushion pads 150 draw lubricating oil into their interiors and positively supply retained lubricating oil to the components of the chain drive. Therefore, smoother flexion of the chain can be maintained. In particular, since the cushion pads 150 are provided in the flank regions 112 between front and rear V-shaped teeth 111, lubricating oil can be positively supplied to the link teeth 111, which engage with the sprocket teeth T.

Figure 5:
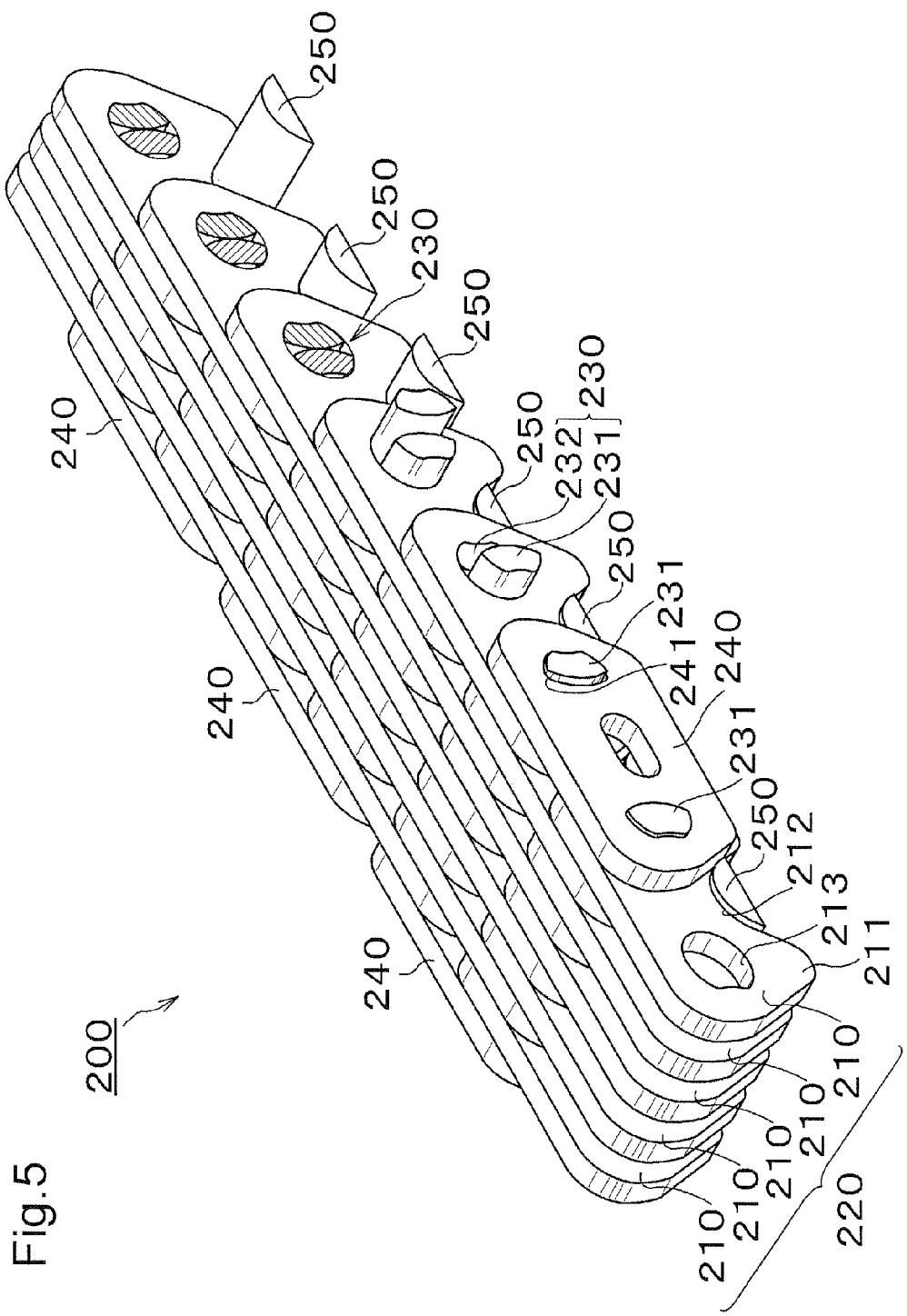
FIG. 5 is a perspective view of a part of a silent chain according to a second embodiment of the invention.
Figure 6:
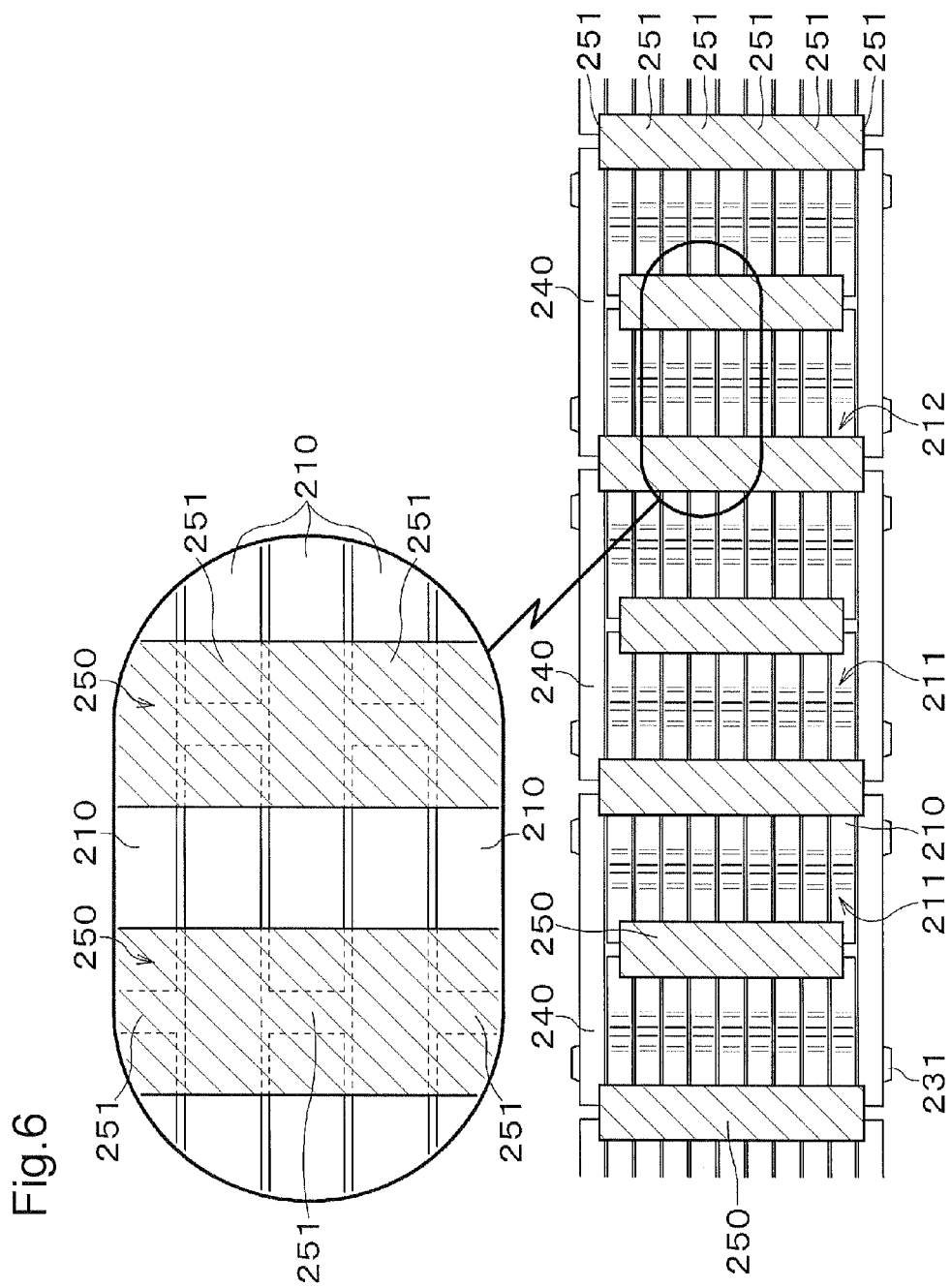
FIG. 6 is a plan view of the silent chain of FIG. 5 as seen from the inner circumferential side thereof.

In chain 200, according to a second embodiment of the invention shown in FIGS. 5 and 6, the configuration of the link plates, guide plates and rocker pins is the same as in the first embodiment, and those parts of the chain are designated by reference numbers that exceed by one hundred the reference numbers of corresponding parts in FIGS. 1 to 4. The chain of the second embodiment differs from the chain of the first embodiment primarily in the configuration of the cushion pads.

In the second embodiment, the cushion pad 250 in each row 220 of link plates 210 is elongated in the widthwise direction of the chain, and is continuous over the length of the row. Each cushion pad 250 is adhered to flank regions 212 of a plurality, and preferably all, of the toothed link plates 210 in its row.

The portions 251 of a cushion pad that extend between adjacent plates in the row in which the cushion pad is situated are engageable with link plates in adjacent rows and also, in the case of a cushion pad in a non-guide row, with guide plates in adjacent guide rows.

In the silent chain 200, the cushion pads 250 which extend through the flank regions 212 of the link plates 210, include parts 251 that extend widthwise beyond the link plates 210. The parts 251 that are disposed in the spaces between adjacent link plates 210 between a link plate 210 and a guide plate 240, restrict inward flexion of the chain, and suppress chordal vibration of the free span regions of the chain so that noise due to the generation of chordal vibration can be prevented.

As in the first embodiment, the cushion pads 250 in the second embodiment are provided in the flank regions 212 opposite to the sprocket teeth T but do not contact the sprocket teeth. Therefore, the cushion pads 250 have no influence on engagement between the V-shaped link teeth 211 and the sprocket teeth T, and the designer has a broad degree of freedom in the design of the engagement surfaces on V-shaped link teeth 211.

The cushion pads 250 are flexible, and therefore avoid the generation of vibration and noise due to contact between pad portions 251 and the link plates of adjacent rows. Flexibility of the cushion pads also eliminates damage to the pad portions 251 and to the link plates 210 and guide plates 240. The cushion pads 250 also avoid drive vibration, which would otherwise inevitably occur in the link plates during operation of the chain. Thus, the generation of the noise during operation of the chain is further suppressed.

Since the cushion pads 250 are elements formed separately from the link plates 210, the designer is afforded a high degree of freedom in the design of the cushion pads, and can adjust their strength and flexibility in accordance with the requirements of the chain drive environment.

In this embodiment, because a unitary cushion pad 250, extending substantially the full width of the chain, is provided for each link row 220, it is unnecessary to provide a separate cushion pad for each link plate as in the first embodiment. Thus, the number of parts is reduced and manufacture of the chain is simplified. Moreover since each elongated cushion pad 250 positions a plurality of link plates 210, backlash of link plates during operation of the chain can be avoided.

As in the first embodiment, the cushion pad 250 is formed of an oil retaining material. The pad portions 251 that protrude in the widthwise direction beyond the inner flank regions of the link plates are sandwiched between pairs of adjacent link plates 210 or guide plates 240, and repeatedly expand and contract during operation of the chain drive, exhibiting an oil pumping effect so that the cushion pads 250 draw lubricating oil into their interiors and positively supply retained lubricating oil to the components of the chain drive. Therefore, smoother flexion of the chain can be maintained. In particular, since the cushion pads 250 are provided in the flank regions 212 between front and rear V-shaped teeth 211, lubricating oil can be positively supplied to the link teeth 211, which engage with the sprocket teeth.

Figure 7:
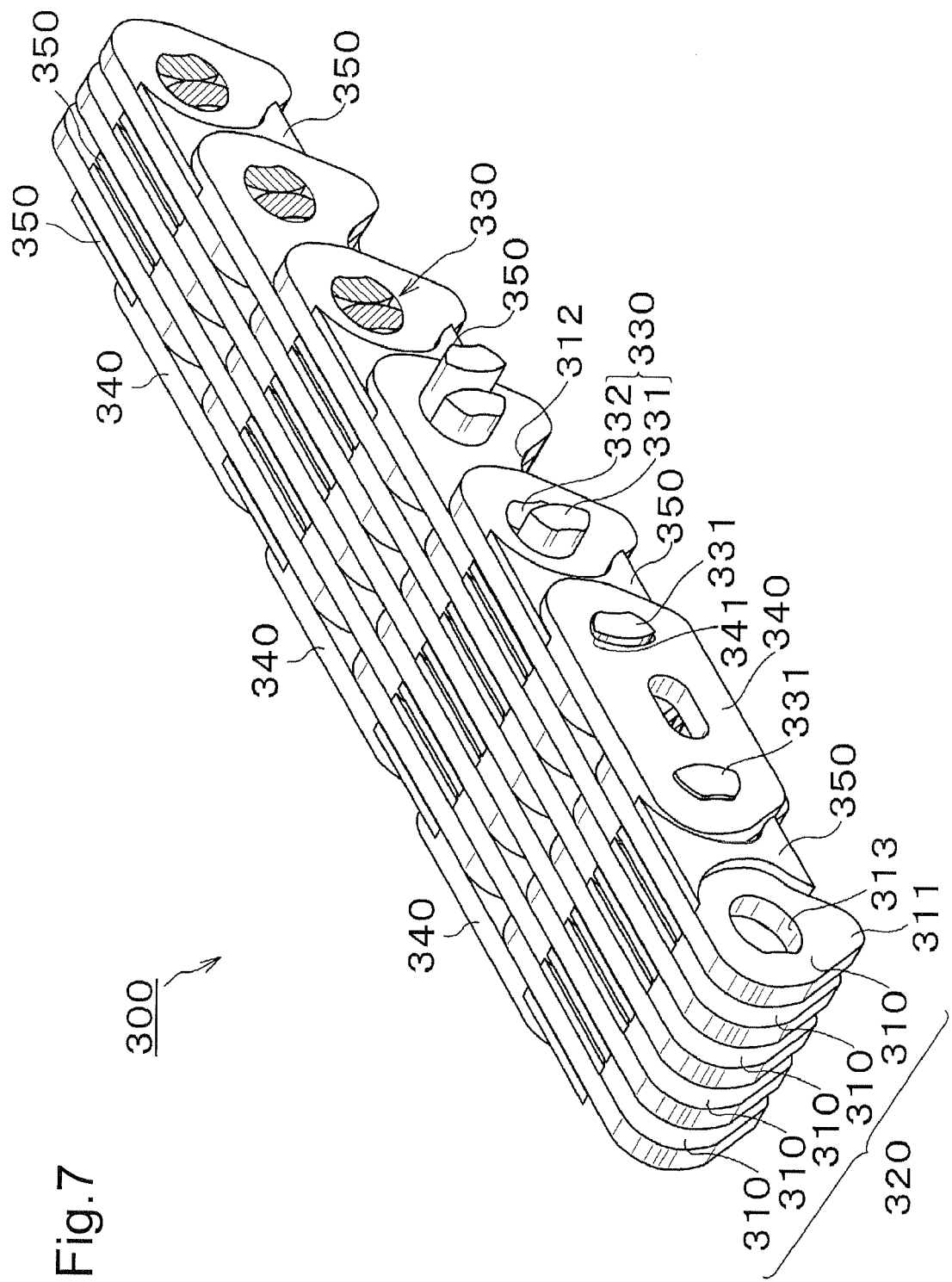
FIG. 7 is a perspective view of a part of a silent chain, according to a third embodiment of the invention.
Figure 8:
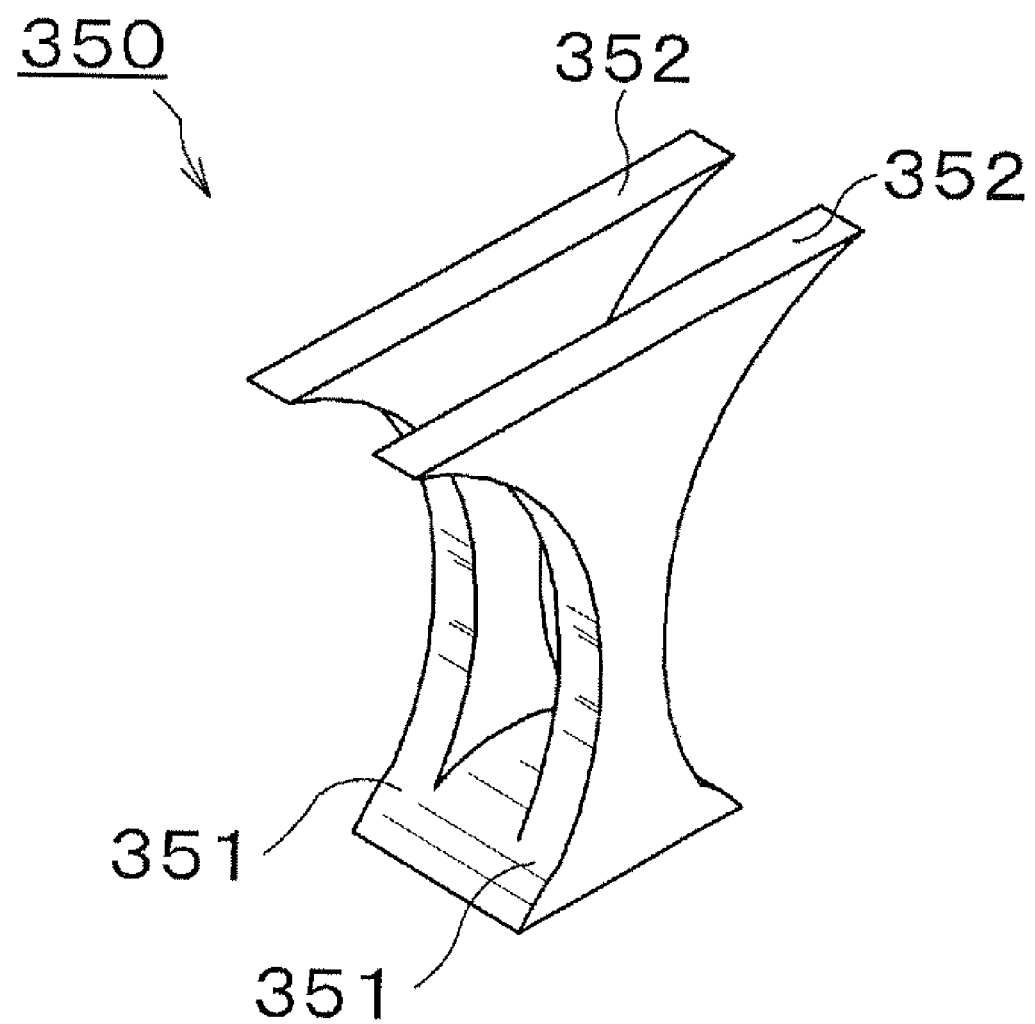
FIG. 8 is a perspective view showing a cushion pad used in the chain of FIG. 7.
Figure 9:
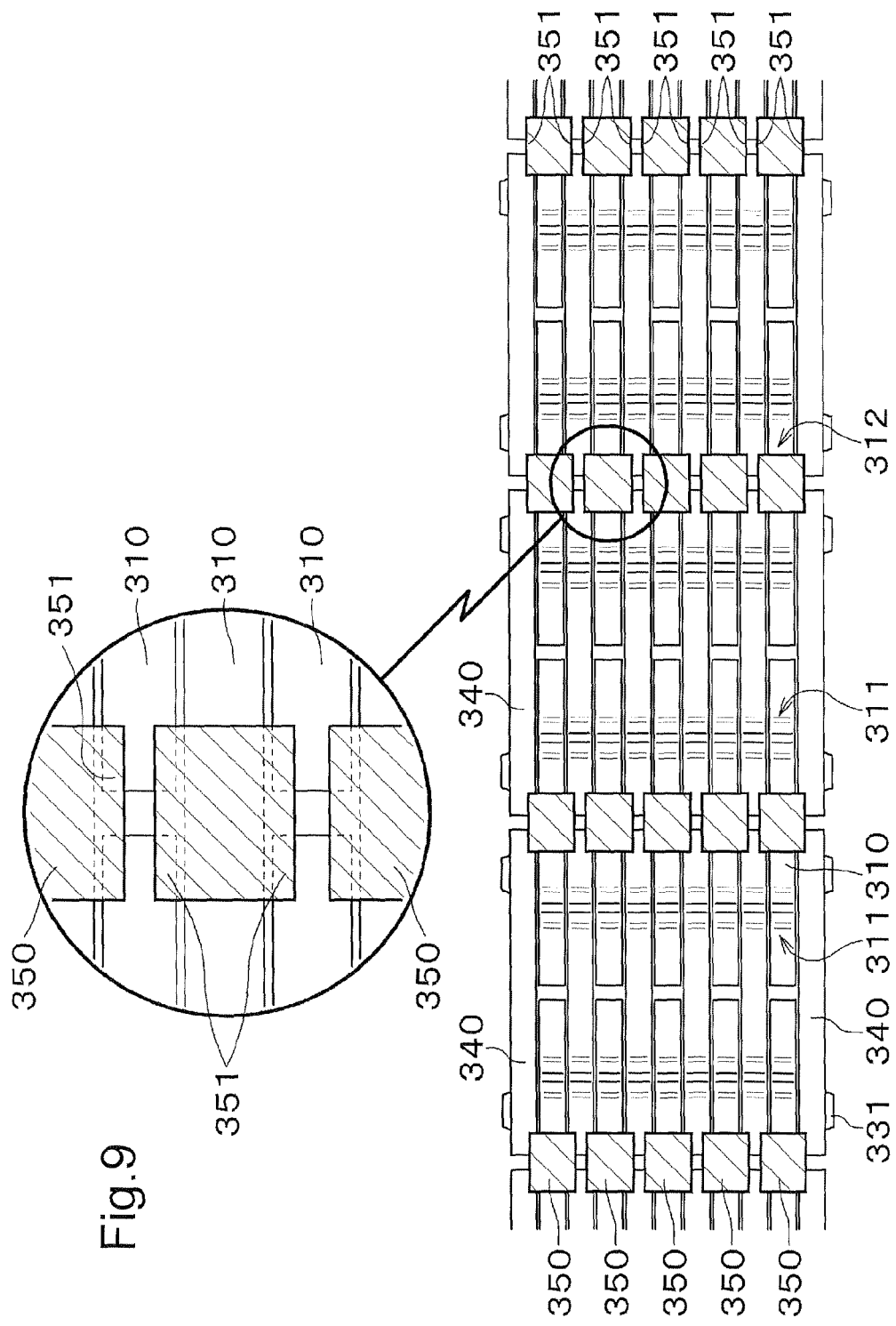
FIG. 9 is a plan view of the silent chain shown in FIG. 7 as seen from the inner circumferential side thereof.

In chain 300, according to a third embodiment of the invention shown in FIGS. 7, 8, and 9, the configuration of the link plates, guide plates and rocker pins is the same as in the first embodiment, and those parts of the chain are designated by reference numbers that exceed by two hundred the reference numbers of corresponding parts in FIGS. 1 to 4. The chain of the third embodiment differs from the chain of the first embodiment primarily in the configuration of the cushion pads, and in the fact that the cushion pads are provided only in the inner flank regions of the non-guide link rows.

Substantially semi-cylindrical parts of cushion pads 350 correspond to the shapes of the flank regions 312 of the link plates 310. Each semi-cylindrical part is adhered to an inner flank portion of a link plate. Parts 351 protrude widthwise beyond the sides of the link plates toward adjacent link plates 310 or guide plates 340 in the same link row 320. In this embodiment, however, the protruding parts also include side parts 352, which extend outward toward the outside of the loop formed by the chain, and progressively increase in width proceeding in the direction toward the outside of the chain.

As in the previously described first and second embodiments, the pad portions 351 that extend beyond the sides of the link plates enter spaces between link plates of adjacent rows, restricting flexion of the link plates of the chain toward the inside of the loop formed by the chain. Chordal vibration in a free span region of the chain can be reliably suppressed, and noise due to chordal vibration can be prevented.

Since the cushion pads 350 in the flank regions 312 are opposite to, but do not contact, the sprocket teeth T, they do not affect the engagement between the link teeth 311 and the sprocket teeth T, and therefore allow the chain designer a broad degree of freedom in the design of the engagement surfaces of the V-shaped link teeth 311.

The cushion pads 350 are flexible, and therefore avoid the generation of vibration and noise due to contact between pad portions 351 and the link plates of adjacent rows. Flexibility of the cushion pads also eliminates damage to the pad portions 351 and to the link plates 310 and guide plates 340. The cushion pads 350 also avoid drive vibration, which would otherwise inevitably occur in the link plates during operation of the chain. Thus, the generation of the noise during operation of the chain is further suppressed.

Since the cushion pads 350 are elements formed separately from the link plates 310, the designer is afforded a high degree of freedom in the design of the cushion pads, and can adjust their strength and flexibility in accordance with the requirements of the chain drive environment.

The side parts 352 of the cushion pads, which extend outward toward the outside of the loop formed by the chain, engage with link plates of adjacent rows and restricts outward flexion of the chain. Thus both inward and outward flexion are restricted, and chordal vibration in the free span regions of the chain is more effectively suppressed. These outwardly extending side parts 352 are preferably shaped to conform to the shapes of the shoulders of the link plates and guide plates of the adjacent link rows.

The outwardly extending parts 352 of the cushion pads also position the link plates in the chain width direction and block backlash of the link plates in the chain width direction during operation of the chain. Moreover, the outwardly extending parts of the cushion pads increase the contact area between the link plates 310 and the cushion pads 350, thereby increasing the vibration-absorbing effect of the cushion pads.

Since the cushion pads 350 are formed of an oil retaining material, and each of the protruding pad portions 351 is sandwiched between a pair of adjacent link plates 310 or guide plates 340, the protruding portions 351 of the pads repeatedly expand and contract during operation of the chain drive, and exhibit an oil pumping effect so that the cushion pads 350 draw lubricating oil into their interiors and positively supply retained lubricating oil to the components of the chain drive. Therefore, smoother flexion of the chain can be maintained. In particular, since the cushion pads 350 are provided in the flank regions 312 between front and rear V-shaped teeth 311, lubricating oil can be positively supplied to the link teeth 311, which engage with the sprocket teeth.

In chain 400, according to a third embodiment of the invention shown in FIGS. 10, 11, 12, and 13, the configuration of the link plates, guide plates and rocker pins is the same as in the first embodiment, and those parts of the chain are designated by reference numbers that exceed by three hundred the reference numbers of corresponding parts in FIGS. 1 to 4. The chain of the fourth embodiment differs from the chain of the first embodiment primarily in the configuration of the cushion pads.

Figure 10:
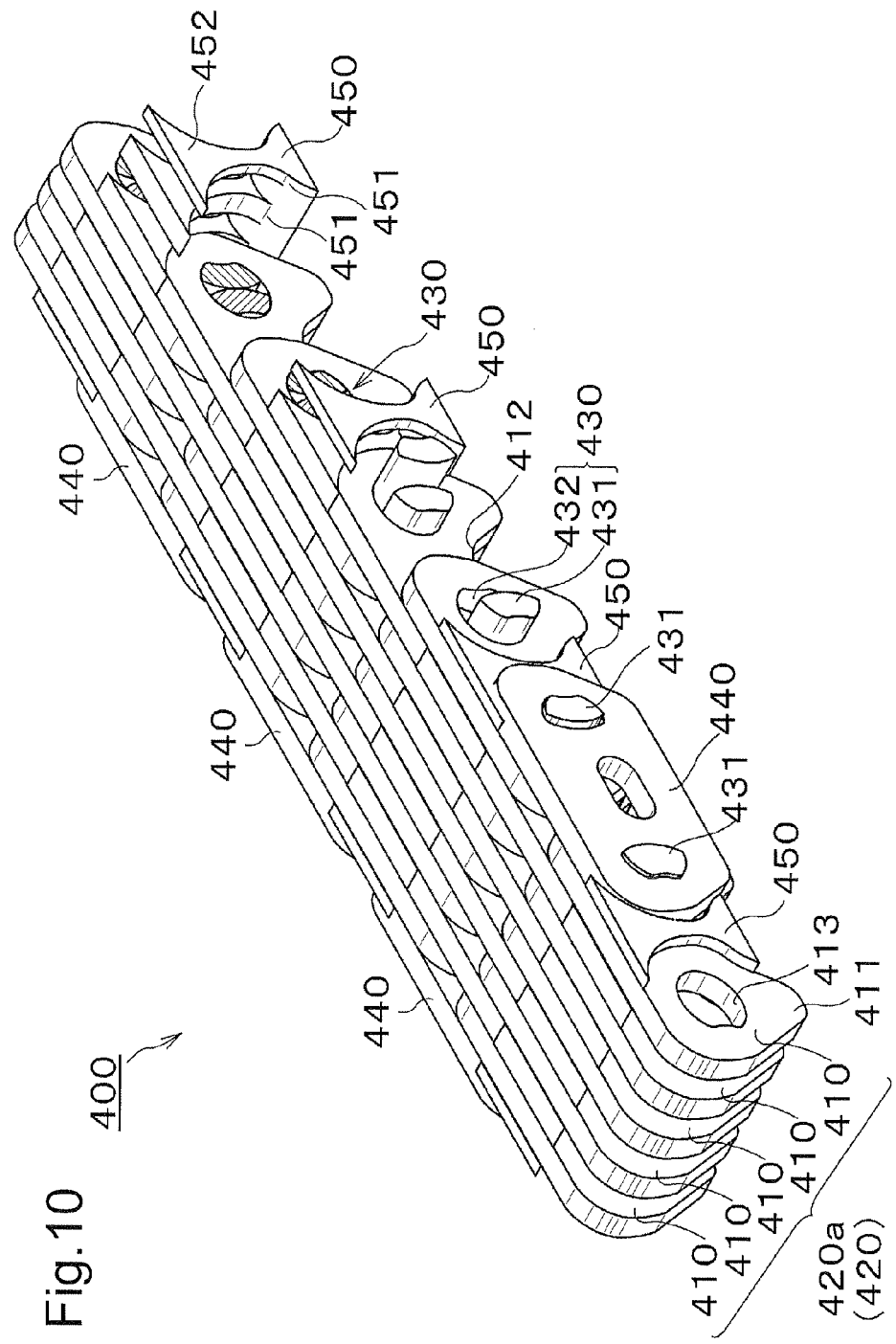
FIG. 10 is a perspective view of a part of a silent chain according to a fourth embodiment of the invention.
Figure 11:
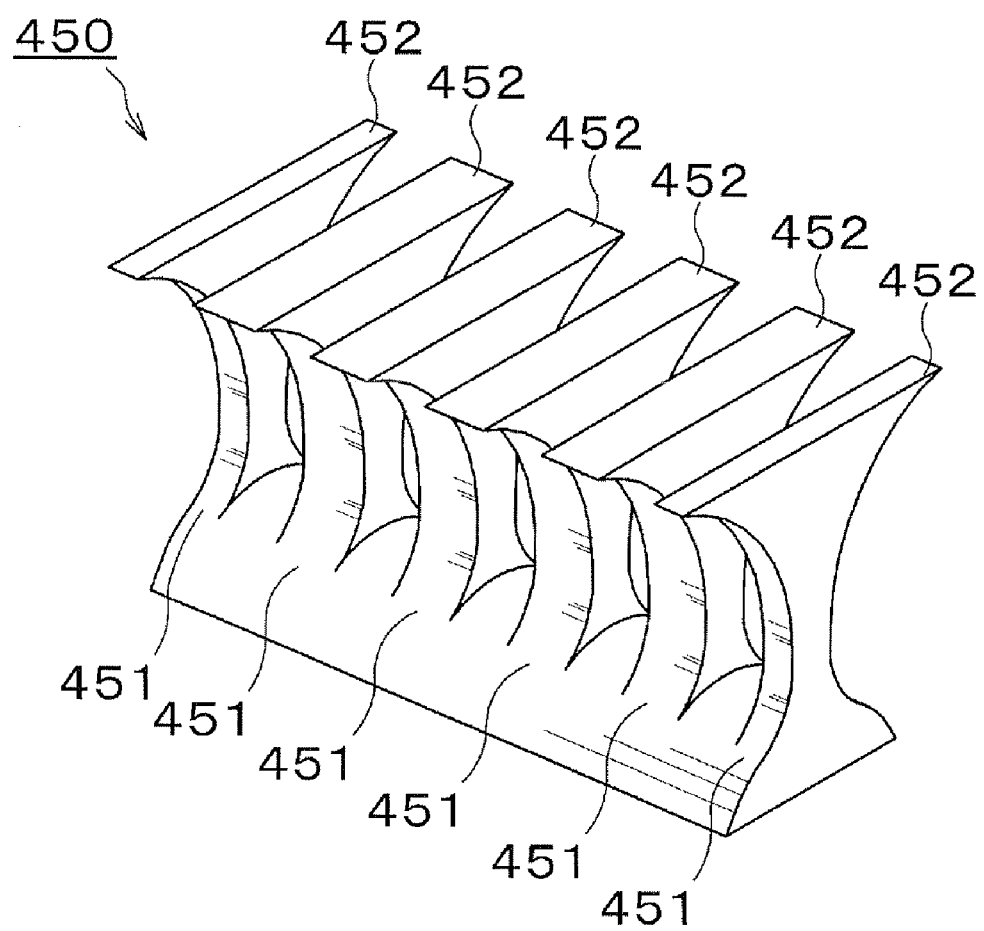
FIG. 11 is a perspective view of a cushion pad used in the chain of FIG. 10.
Figure 12:
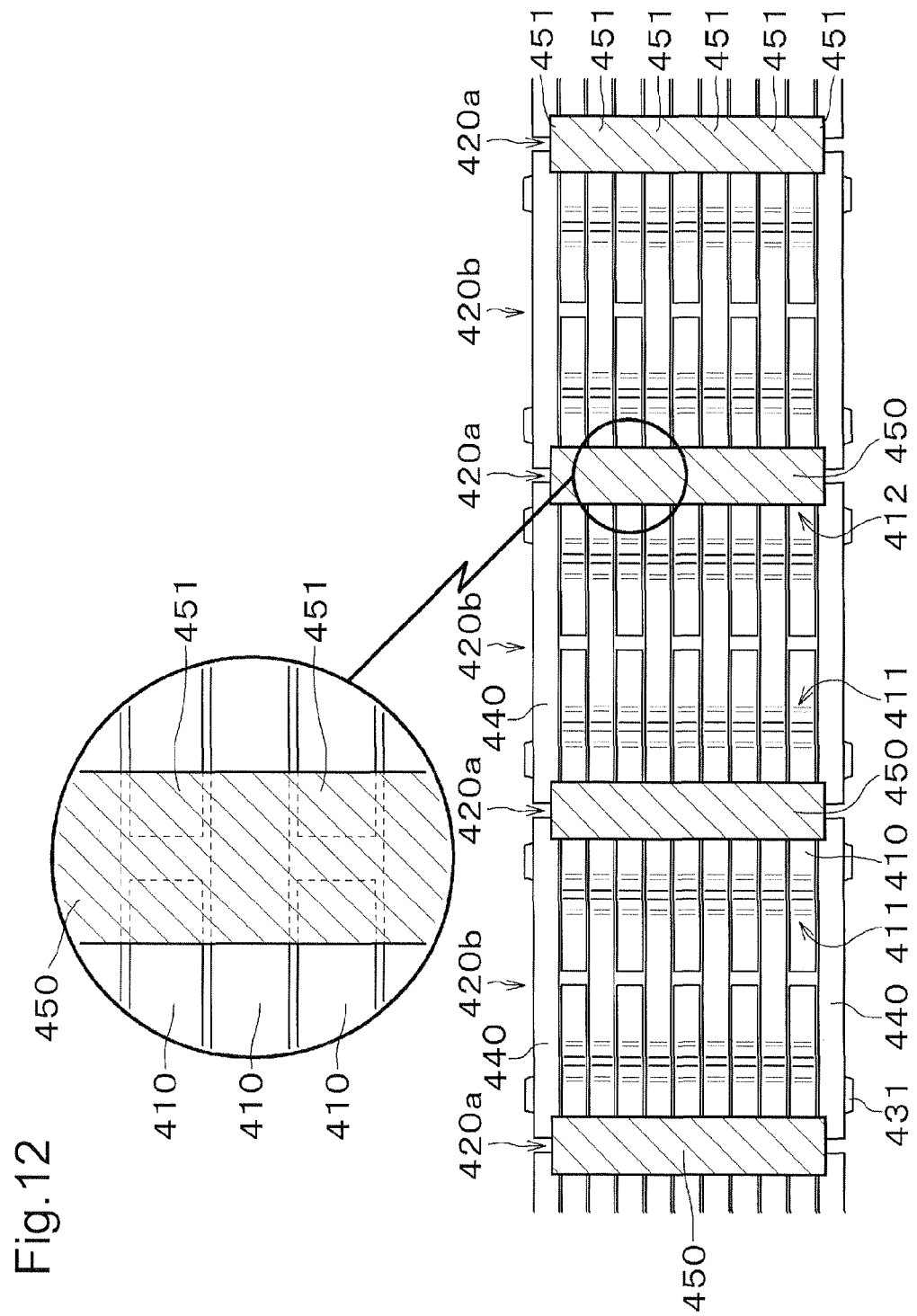
FIG. 12 is a plan view of the silent chain of FIG. 10 as seen from the inner circumferential side thereof.
Figure 13:
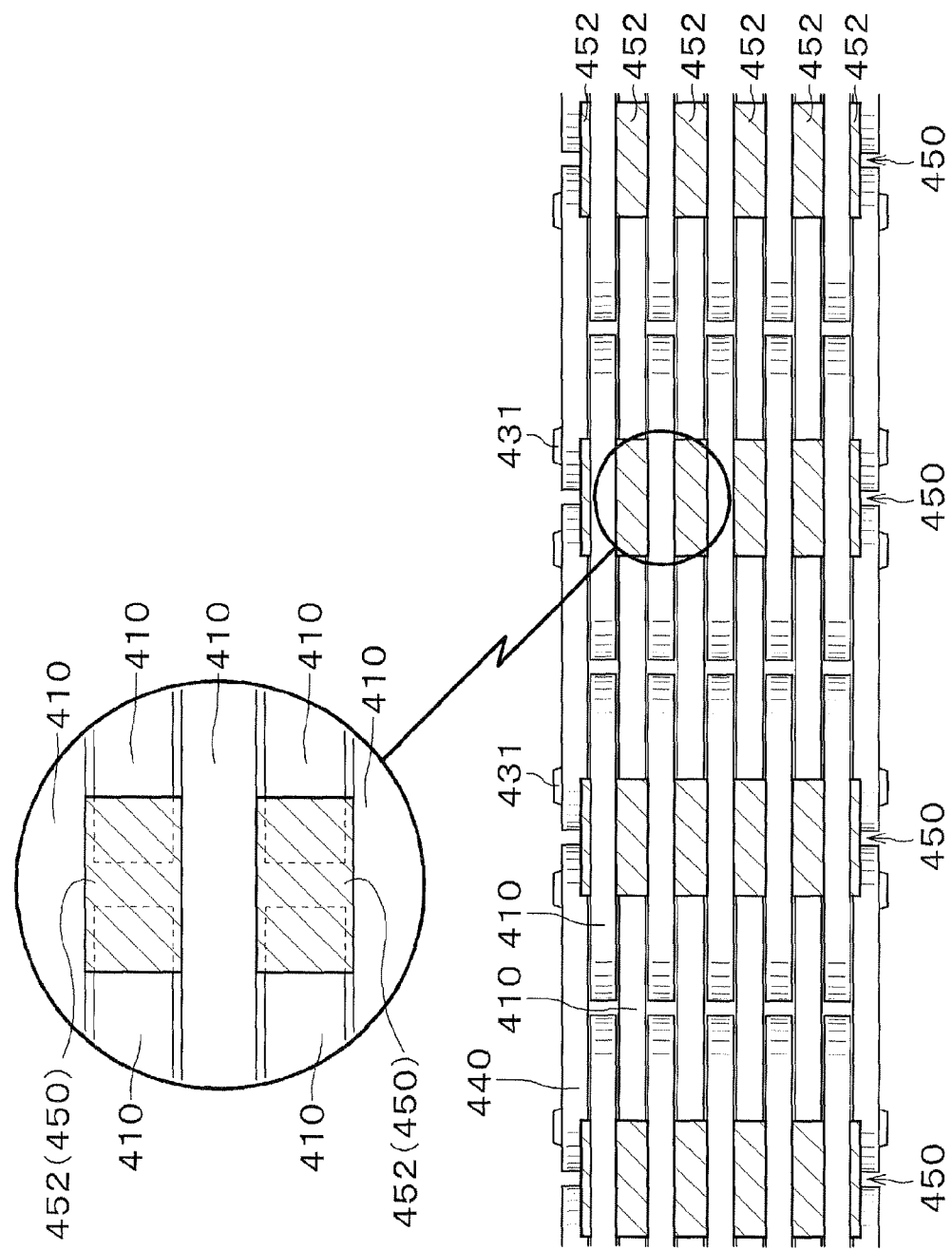
FIG. 13 is a plan view of the silent chain of FIG. 10 as seen from the outer circumferential side thereof.

As shown in FIGS. 10 and 12, a unitary cushion pad 450 is provided in every non-guide link row 420a, i.e., in every row not having guide plates 440 at its ends on the outermost sides of the chain. The cushion pads 450 are adhered to flank regions 412 of the link plates 410. Optionally, cushion pads may also be provided in the guide rows 420b.

Substantially semi-cylindrical parts of cushion pads 450 correspond to the shapes of the flank regions 412 of the link plates 410. Each semi-cylindrical part is adhered to the inner flank portions of the link plates 410 in a non-guide row. Parts 451 protrude widthwise beyond the sides of the link plates toward adjacent link plates the same link row 420a. In this embodiment, as in the third embodiment, the protruding parts also include side parts 452, which extend outward toward the outside of the loop formed by the chain, and progressively increase in width proceeding in the direction toward the outside of the chain. As in the third embodiment, these side parts 452 preferably conform to the shapes of the shoulders of the adjacent link plates and guide plates.

As in the previously described embodiments, the pad portions 451 that extend beyond the sides of the link plates enter spaces between link plates of adjacent rows, restricting flexion of the link plates of the chain toward the inside of the loop formed by the chain. Chordal vibration in a free span region of the chain can be reliably suppressed, and noise due to chordal vibration can be prevented.

Since the cushion pads 450 in the flank regions 412 are opposite to, but do not contact, the sprocket teeth, they do not affect the engagement between the link teeth 411 and the sprocket teeth T, and therefore allow the chain designer a broad degree of freedom in the design of the engagement surfaces of the V-shaped link teeth 411.

The cushion pads 450 are flexible, and therefore avoid the generation of vibration and noise due to contact between pad portions 451 and the link plates of adjacent rows. Flexibility of the cushion pads also eliminates damage to the pad portions 451 and to the link plates 410 and guide plates 440. The cushion pads 450 also avoid drive vibration, which would otherwise inevitably occur in the link plates during operation of the chain. Thus, the generation of the noise during operation of the chain is further suppressed.

Since the cushion pads 450 are elements formed separately from the link plates 410, the designer is afforded a high degree of freedom in the design of the cushion pads, and can adjust their strength and flexibility in accordance with the requirements of the chain drive environment.

In the assembly of the chain, a unitary cushion pad 450 can be provided in every non-guide row 420a, without providing a separate cushion pad for every link plate. Thus the number of parts is reduced and assembly of the chain is simplified. Moreover, since each cushion pad 450 positions a plurality of link plates 410 in the widthwise direction, backlash of link plates 410 in the widthwise direction can be prevented.

The side parts 452 of the cushion pads, which extend outward toward the outside of the loop formed by the chain, engage with link plates of adjacent rows and restricts outward flexion of the chain. Thus both inward and outward flexion are restricted, and chordal vibration in the free span regions of the chain is more effectively suppressed. Moreover, the outwardly extending parts of the cushion pads increase the contact area between the link plates 410 and the cushion pads 450, thereby increasing the vibration-absorbing effect of the cushion pads. The intermediate side parts 452 of each cushion pad are preferably as wide as the spacing between adjacent link plates in a row so that they contact both link plates of each adjacent pair. The endmost side parts 452, however, can be narrower than the intermediate side parts.

Since the cushion pads 450 are formed of an oil retaining material, and each of the protruding pad portions 451 is sandwiched between a pair of adjacent link plates 410 or guide plates 440, the protruding portions 451 of the pads repeatedly expand and contract during operation of the chain drive, and exhibit an oil pumping effect so that the cushion pads 450 draw lubricating oil into their interiors and positively supply retained lubricating oil to the components of the chain drive. Therefore, smoother flexion of the chain can be maintained. In particular, since the cushion pads 450 are provided in the flank regions 412 between front and rear V-shaped teeth 411, lubricating oil can be positively supplied to the link teeth 411, which engage with the sprocket teeth.

What is claimed is:

1. A silent chain comprising an elongated series of interleaved rows of link plates, each link plate having front and rear V-shaped teeth for engagement with sprocket teeth, an inner flank region between said front and rear V-shaped teeth for receiving sprocket teeth without contacting the sprocket teeth, and front and rear connecting pin holes formed in each link plate respectively adjacent the front and rear V-shaped teeth, the V-shaped teeth being arranged in parallel rows extending in a direction of the chain width perpendicular to the direction of elongation of the chain, and connecting pins extending through said pin holes in the direction of the chain width, and flexibly connecting the interleaved rows of link plates to one another to form an endless loop, wherein cushion pads are provided in the inner flank regions of the link plates of at least every second one of said rows of link plates, and wherein each said cushion pad extends in the direction of the chain width beyond the sides of the link plate having the inner flank region in which said cushion pad is provided.

2. The silent chain according to claim 1, in which each said cushion pad is a continuous pad extending through substantially the full length of the row of toothed link plates in the flank regions of the row in which it is situated.

3. The silent chain according to claim 1, in which each said cushion pad has side parts disposed on both sides of each of the link plates in the link plate row in the inner flank region of which said cushion pad is provided, each said part extending toward the outside of said loop and at least a part of each said part becoming progressively wider proceeding in a direction toward the outside of said loop.

4. The silent chain according to claim 1, in which each said cushion pad is formed of a material which retains lubricating oil.

5. The silent chain according to claim 1, in which each said cushion pad is a continuous pad extending through substantially the full length of the row of toothed link plates in the flank regions of the row in which it is situated, in which each said cushion pad has side parts disposed on both sides of each of the link plates in the link plate row in the inner flank region of which said cushion pad is provided, in which each said part extends toward the outside of said loop and in which at least a part of each said part becomes progressively wider proceeding in a direction toward the outside of said loop.

6. The silent chain according to claim 1, in which each said cushion pad is a continuous pad extending through substantially the full length of the row of toothed link plates in the flank regions of the row in which it is situated, and in which each said cushion pad is formed of a material which retains lubricating oil.

7. The silent chain according to claim 1, in which each said cushion pad has side parts disposed on both sides of each of the link plates in the link plate row in the inner flank region of which said cushion pad is provided, each said part extending toward the outside of said loop and at least a part of each said part becoming progressively wider proceeding in a direction toward the outside of said loop, and in which each said cushion pad is formed of a material which retains lubricating oil.

8. The silent chain according to claim 1, in which each said cushion pad is a continuous pad extending through substantially the full length of the row of toothed link plates in the flank regions of the row in which it is situated, in which each said cushion pad has side parts disposed on both sides of each of the link plates in the link plate row in the inner flank region of which said cushion pad is provided, in which each said part extends toward the outside of said loop and at least a part of each said part becomes progressively wider proceeding in a direction toward the outside of said loop, and in which each said cushion pad is formed of a material which retains lubricating oil.

\* \* \* \* \*